United States Patent
Gardner

(10) Patent No.: US 6,474,984 B2
(45) Date of Patent: Nov. 5, 2002

(54) AIR INJECTION FOR NITROGEN OXIDE REDUCTION AND IMPROVED PRODUCT QUALITY

(75) Inventor: Kenneth L. Gardner, Riverside, PA (US)

(73) Assignee: Metso Minerals Industries, Inc., Waukesha, WI (US)

(*) Notice: Subject to any disclaimer, the term of this patent is extended or adjusted under 35 U.S.C. 154(b) by 0 days.

(21) Appl. No.: 09/918,269

(22) Filed: Jul. 30, 2001

(65) Prior Publication Data

US 2002/0061489 A1 May 23, 2002

Related U.S. Application Data

(60) Provisional application No. 60/252,121, filed on Nov. 20, 2000.

(51) Int. Cl.$^7$ ................................. F27B 7/20
(52) U.S. Cl. ................. 432/117; 432/196; 110/246; 110/346
(58) Field of Search ................. 432/117, 103, 432/113, 196–198, 201, 14, 58; 106/758; 110/245, 246, 346

(56) References Cited

U.S. PATENT DOCUMENTS

| | | |
|---|---|---|
| 1,121,906 A | 12/1914 | Downs |
| 2,813,822 A | 11/1957 | Collier .................. 202/6 |
| 3,087,790 A | 4/1963 | Wheelock et al. .......... 23/186 |
| 3,584,850 A | 6/1971 | Brandvold et al. ........ 263/32 |
| 3,633,894 A | 1/1972 | Sunnegren ............... 263/53 |
| 3,661,370 A | 5/1972 | Rossi .................... 263/33 |
| 3,751,220 A | 8/1973 | Rossi ................... 432/115 |
| 3,794,483 A | 2/1974 | Rossi .................... 75/91 |
| 3,847,538 A | 11/1974 | Rossi .................. 432/113 |
| 3,888,621 A | 6/1975 | Williams ................ 432/19 |
| 3,945,624 A | 3/1976 | Rossi ................... 266/20 |
| 3,966,560 A | 6/1976 | Farago et al. ........... 201/32 |
| 4,053,356 A | 10/1977 | Welter ................. 202/100 |
| 4,070,149 A | 1/1978 | Rossi .................. 432/109 |

(List continued on next page.)

FOREIGN PATENT DOCUMENTS

WO  WO 00/07910  2/2000  ........... B65G/25/00

OTHER PUBLICATIONS

H.P. Lausch and W. Schnabel, Limestone Calcining Process using a Shell–fired Rotary Kiln for Producing High–Reactive Quicklime, Presented on the 4$^{th}$ International Lime Congress, Hershey, Pennsylvania, USA, 21$^{st}$ and 22$^{nd}$ Sep. 1978.

Patent Cooperation Treaty International Search Report, Apr. 24, 2002.

Primary Examiner—Gregory Wilson
(74) Attorney, Agent, or Firm—Kinney & Lange, PA

(57) ABSTRACT

A calcining system is operated in a substoichiometric mode for reducing nitrogen oxide generation and removing sulfur from materials to be processed by creating an oxygen deficient atmosphere. The calcining system includes a rotary kiln rotating on a slightly inclined horizontal axis. The rotary kiln has a feed end introducing material to be processed and a discharge end. A preheating/precalcining device is positioned adjacent the feed end such that the material passes through the device prior to entering the rotary kiln. A stationary hood surrounds the discharge end. A burner is supported by the stationary hood. The burner introduces combustible fuel and combustion air into the rotary kiln through the discharge end and operates in a substoichiometric mode. At least one air nozzle is located along the length of the rotary kiln. The air nozzle injects combustion air into the rotary kiln. The combustion air introduced by the air nozzle completely combusts the combustible fuel introduced by the burner before the combustible fuel exits the feed end.

30 Claims, 1 Drawing Sheet

U.S. PATENT DOCUMENTS

| | | | |
|---|---|---|---|
| 4,120,645 A | 10/1978 | Heian et al. | 432/106 |
| 4,220,631 A | 9/1980 | Serbent et al. | 423/175 |
| 4,259,081 A | 3/1981 | Reuter et al. | 23/293 |
| 4,273,314 A | 6/1981 | Keran et al. | 266/145 |
| 4,330,325 A | 5/1982 | Keran et al. | 75/36 |
| 4,340,359 A | 7/1982 | Struckmann | 432/14 |
| 4,368,177 A | 1/1983 | Schnabel et al. | 423/175 |
| 4,389,242 A | 6/1983 | Baker et al. | 75/20 |
| 4,402,273 A | 9/1983 | Nagl et al. | 110/229 |
| 4,462,793 A | 7/1984 | Maeda et al. | 432/14 |
| 4,957,050 A | 9/1990 | Ho | 110/346 |
| 5,031,549 A | 7/1991 | Collins, Jr. et al. | 110/346 |
| 5,076,838 A | 12/1991 | Rierson | 75/479 |
| 5,100,314 A | 3/1992 | Rierson | 432/103 |
| 5,224,433 A | 7/1993 | Benoit et al. | 110/346 |
| 5,248,330 A | 9/1993 | Rierson | 75/746 |
| 5,431,560 A | 7/1995 | Helker et al. | 432/103 |
| 5,454,715 A | 10/1995 | Hansen et al. | 432/103 |
| 5,569,030 A | 10/1996 | Hansen et al. | 432/103 |
| 5,632,616 A | 5/1997 | Tutt et al. | 432/105 |
| 5,779,468 A | 7/1998 | Helker | 432/103 |
| 5,908,291 A | 6/1999 | Dover et al. | 432/107 |
| 6,050,203 A | 4/2000 | Reese et al. | 110/246 |
| 6,116,896 A * | 9/2000 | Joshi et al. | 432/117 |
| 6,221,127 B1 | 4/2001 | Rierson | 75/477 |

* cited by examiner

AIR INJECTION FOR NITROGEN OXIDE REDUCTION AND IMPROVED PRODUCT QUALITY

CROSS-REFERENCE TO RELATED APPLICATION(S)

This application claims priority from Provisional Application No. 60/252,121 filed Nov. 20, 2000, entitled "Air Injection For Nitrogen Oxide Reduction And Improved Product Quality" by Kenneth L. Gardner.

BACKGROUND OF THE INVENTION

The present invention relates to a calcining system. In particular, the calcining system is operated in a substoichiometric mode to reduce nitrogen oxide generation and aid in removing sulfur from the materials to be processed.

Rotary kilns are used in calcining systems to process materials, such as limestone and mineral ores. Typically, the feed material is oxidized, hardened and/or reduced by passing through the rotary kiln. The material may be preheated by a preheating device prior to entering the rotary kiln. The rotary kiln is slightly inclined on a horizontal axis and has a feed end and a discharge end. The material enters at the feed end, is processed in the rotary kiln and exits at the discharge end. The processed material exits at the discharge end where it may enter a cooling device.

During the processing of the material, combustible fuel and combustion air are introduced into the rotary kiln to oxidize the material. Current systems generate high nitrogen oxide emissions and do not remove sulfur from the materials being processed. One way of reducing nitrogen oxide emissions from a rotary kiln calcining system is to install a nitrogen oxide removal equipment at the gas exhaust end of the kiln. However, the inclusion of nitrogen oxide removal equipment is expensive and results in high operating costs. Current systems will remove sulfur from the feed material by heating the material to temperatures in excess of 2500° F. Heating the material to such high temperatures results in lower product quality, such as a low slaking rate or low reactivity.

Combustion air, to combust a combustible fuel (or combustible material), is typically introduced into the rotary kiln at the discharge end of the kiln. Combustion air is introduced with the combustible fuel to combust the combustible fuel upstream of the air injection. When combustion air is introduced along the length of the rotary kiln it is typically introduced with combustible fuel, thereby creating upstream combustion of the combustible fuel. Upstream combustion of the combustible fuel does not aid in removal of sulfur from the feed material.

A calcining system is needed in the art for creating an oxygen deficient atmosphere in the kiln that will lower nitrogen oxide generation an aid in removing sulfur from the materials to be processed. Furthermore, the calcining system should completely combust the combustible fuel before it exits the rotary kiln.

BRIEF SUMMARY OF THE INVENTION

The present invention is a calcining system operating in a substoichiometric mode for reducing nitrogen oxide generation and removing sulfur from materials to be processed by creating an oxygen deficient atmosphere. The calcining system includes a rotary kiln rotating on a slightly inclined horizontal axis. The rotary kiln has a feed end introducing material to be processed and a discharge end. The calcining system further includes a precalcining device positioned adjacent the feed end such that the material passes through the device prior to entering the rotary kiln. A stationary hood surrounds the discharge end of the rotary kiln. A burner protrudes the stationary hood. The burner introduces combustible fuel and combustion air into the rotary kiln through the discharge end and operates in a substoichiometric mode. At least one air nozzle is located along the length of the rotary kiln. The air nozzles inject combustion air into the rotary kiln. The combustion air introduced by the air nozzles completely combusts the combustible fuel introduced by the burner before the combustible fuel exits the feed end.

In another preferred embodiment of the invention, a method is used for calcining a feed material in a rotary kiln rotating on a slightly inclined horizontal axis. The method includes introducing the feed material into the rotary kiln through a feed end of the rotary kiln. Combustible fuel is introduced into the rotary kiln through a burner located in a stationary hood adjacent a discharge end of the rotary kiln such that the combustible fuel travels through the rotary kiln towards the feed end of the rotary kiln. The rotary kiln operates in a substoichiometric mode near the discharge end. Combustion air is introduced into the rotary kiln through the discharge end of the rotary kiln. Combustion air is injected into the rotary kiln between the feed and discharge ends of the rotary kiln through at least one air nozzle. The combustion air injected by the air nozzles completely combust the combustible fuel introduced by the burner before the combustible fuel exits the feed end of the rotary kiln as exhaust gas. The method creates an oxygen deficient atmosphere at the discharge end of the rotary kiln. The oxygen deficient atmosphere lowers nitrogen oxide generation and aids in removing sulfur from the feed material being processed.

DETAILED DESCRIPTION

Figure 1:
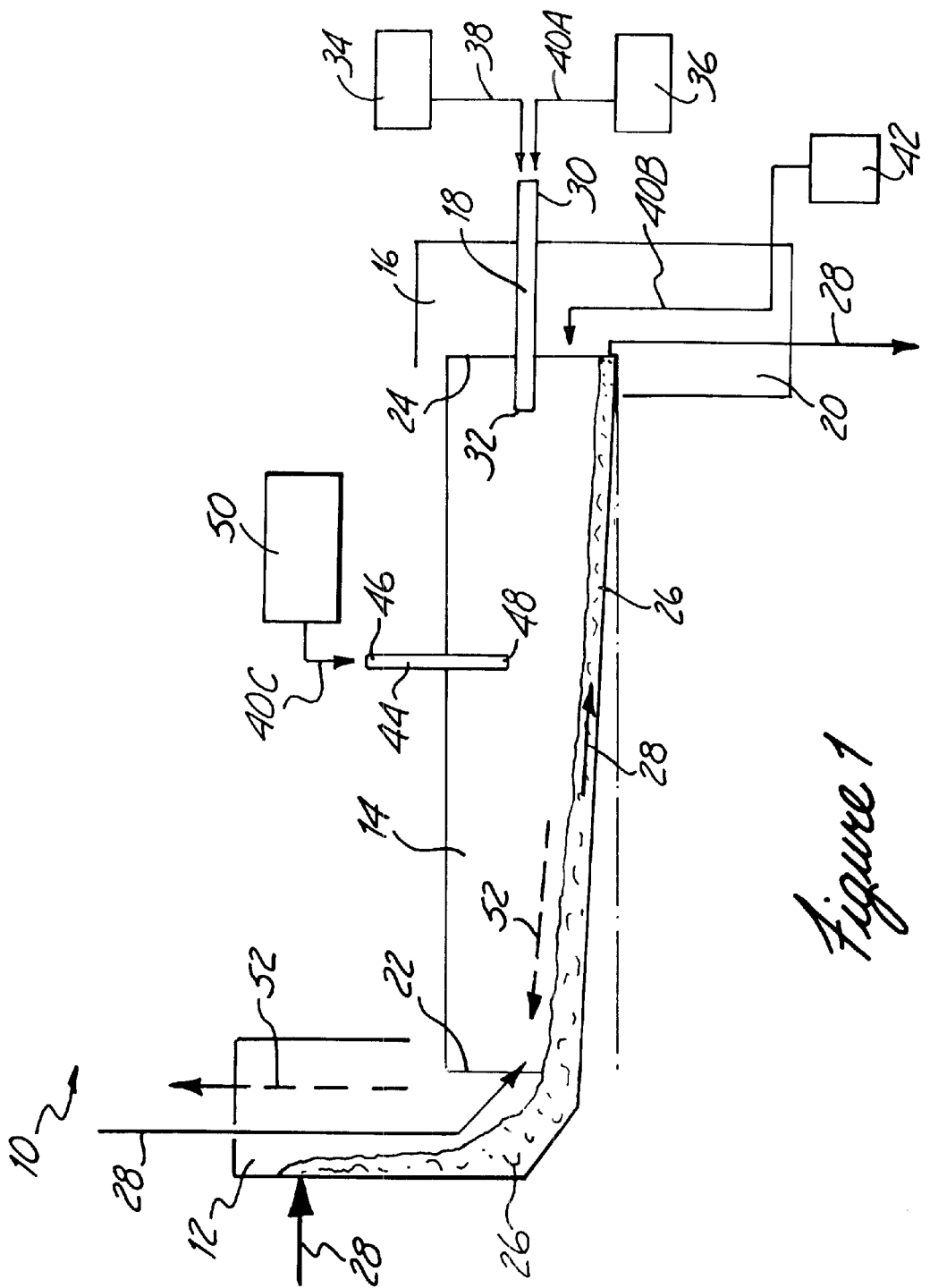
FIG. 1 is a schematic diagram of a calcining system of the present invention.

FIG. 1 is a schematic diagram of a calcining system 10. Calcining system 10 includes a preheating (or precalcining) device 12, a rotary kiln 14, a stationary hood 16, a burner 18 and a cooling device 20. Although calcining system 10 is shown including preheating device 12 and cooling device 20, calcining systems may be used which do not include these devices.

Rotary kiln 14 has a feed end 22 and a discharge end 24. Rotary kiln 14 has a slightly inclined horizontal axis sloping downward from feed end 22 to discharge end 24. Preheating device 12 is positioned adjacent feed end 22 of rotary kiln 14. Stationary hood 16 is positioned adjacent discharge end 24 of rotary kiln 14 and cooling device 20 is located at discharge end 24 of rotary kiln 14 and is preferably attached to stationary hood 16. Stationary hood 16 serves as a transition between rotary kiln 14 and cooling device 20.

A feed material 26, such as limestone or mineral ores, is processed by calcining system 10. Processing of feed material 26 may include oxidation, hardening or reducing of the material. Feed material 26 passes through preheating device 12 where material 26 is heated before it enters rotary kiln 14. Material 26 enters rotary kiln 24 at feed end 22 and passes along a length of rotary kiln 14. Feed material 26 exits rotary kiln 14 at discharge end 24. Once material 26 exits rotary kiln 14, the material passes through cooling device 20 where it is cooled by indirect means or a direct air contact cooler. Lines 28 indicate the path of feed material 26 through calcining system 10.

Burner 18 is supported by and within stationary hood 16. Burner 18 has a supply end 30 and a discharge end 32. Supply end 30 extends out of stationary hood 16 and is attached to a fuel supply 34 and a primary combustion air supply 36. Fuel supply 34 provides combustible fuel 38 (or combustible material) and primary combustion air supply 36 provides combustion air 40 at discharge end 24 of rotary kiln 14. Discharge end 32 of burner 18 extends into rotary kiln 14 through discharge end 24. Discharge end 32 of burner 18 introduces combustible fuel 38 and combustion air 40 into rotary kiln 14 at discharge end 24.

A secondary combustion air supply 42 introduces combustion air 40 into rotary kiln 14 through discharge end 24 of rotary kiln 14. Besides cooling feed material 26, cooling device 20 may also preheat secondary combustion air supply 42.

A nozzle 44 is located along the length of rotary kiln 14 between feed end 22 and discharge end 24. Nozzle 44 extends into rotary kiln 14. Nozzle 44 has a supply end 46 and a discharge end 48 extending into rotary kiln 14. A tertiary combustion air supply 50 is attached to supply end 46 of nozzle 44. Tertiary air supply 50 may be a blower or a stationary housing with a manifold supply. Air supply 50 provides combustion air 40 for injecting into rotary kiln 14 through discharge end 48 of nozzle 44. Multiple nozzles 44 may be used in calcining system 10 to inject combustion air into the rotary kiln.

Combustion air 40A indicates the combustion air supplied by primary combustion air supply 36. Combustion air 40B indicates the combustion air supplied by secondary combustion air supply 42 and combustion air 40C indicates the combustion air supplied by tertiary combustion air supply 50.

Combustion air 40A and 40B combusts a substantial portion of combustible fuel 38 added at discharge end 24 of rotary kiln 14. Discharge end 24 is the normal kiln burning zone. Combustion air 40C injected through nozzle 44 along the length of rotary kiln 14 aids in completely combusting combustible fuel 38 at discharge end 24 before combustible fuel 38 exits feed end 22 of rotary kiln 14. After completely combusting combustible fuel 38, an exhaust gas 52 exits rotary kiln 14 at feed end 22.

Preferably, about 75 percent to about 98 percent of the total combustion air 40 (as combustion air 40A and 40B) is introduced at the normal kiln burning zone at the discharge end 24 of rotary kiln 14 through burner 18 (with combustible fuel 38) and secondary combustion air supply 42. Preferably, about two percent to about 25 percent of the total combustion air 40 (as combustion air 40C) is injected with turbulence between feed end 22 and discharge end 24 of rotary kiln 14 to complete the combustion process by thoroughly mixing with the partially combustible fuel 38. Thereby, a low level of carbon monoxide (in exhaust gas 52) is obtained exiting rotary kiln 14 at feed end 22. An oxygen deficient atmosphere is created at discharge end 24 of rotary kiln 14 by controlling the amount of total combustion air 40 injected through nozzle 44 as compared to the amount of total combustion air 40 introduced in the normal kiln burning zone at the discharge end 24 of rotary kiln 14.

In prior art calcining systems, combustion air 40A and 40B provided by primary and secondary combustion air supplies 36 and 42 creates a slight oxygen rich atmosphere at discharge end 24 of rotary kiln 14. Generally, preheating combustion air 40B improves the thermal efficiency of calcining system 10. However, the elevated secondary combustion air 40B temperature creates a high flame temperature from burner 18 and thereby high nitrogen oxide generation.

Calcining system 10 operates in a substoichiometric mode at discharge end 24 of rotary kiln 14. Injecting combustion air 40C along the length of rotary kiln 14 aids in operating calcining system 10 in a substoichiometric mode. Tertiary combustion air 40C reduces the flame temperature of burner 18. Tertiary combustion air 40C controls the atmosphere within rotary kiln 14 between nozzle 44 and discharge end 24 to create an oxygen deficient atmosphere at discharge end 24 of rotary kiln 14. The oxygen deficient atmosphere at discharge end 24 lowers the generation of nitrogen oxide. Furthermore, the oxygen deficient atmosphere and lower flame temperature of burner 18 aids in removing of sulfur from feed material 26 by creating a reducing atmosphere at discharge end 24 of rotary kiln 14. The addition of more nozzles 44 may be used to stage the combustion of fuel 38 within rotary kiln 14 and further reduce nitrogen oxide generation.

The use of a nozzle to inject a ratio of the total combustion air from a tertiary combustion air supply into a rotary kiln creates an oxygen deficient atmosphere within the kiln near the discharge end. The oxygen deficient atmosphere lowers the nitrogen oxide generation in the rotary kiln and aids in the removal of sulfur from a feed material being processed. Furthermore, the injection of combustion air along a length of the rotary kiln helps to completely combust the combustible fuel before the combustible fuel exits the rotary kiln.

Although the present invention has been described with reference to referred embodiments, workers skilled in the art will recognize that changes may be made in form and detail without departing from the spirit and scope of the invention.

What is claimed is:

1. A calcining system operating in a substoichiometric mode for reducing nitrogen oxide generation and removing sulfur from materials to be processed by creating an oxygen deficient atmosphere, the calcining system comprising:

a rotary kiln rotating on a slightly inclined horizontal axis, the rotary kiln having a feed end introducing material to be processed and a discharge end;

a preheating/precalcining device positioned adjacent the feed end wherein the material passes through the device prior to entering the rotary kiln;

a stationary hood positioned adjacent the discharge end of the rotary kiln;

a burner protruding the stationary hood, the burner introduces combustible fuel and combustion air into the rotary kiln through the discharge end and operating in a substoichiometric mode; and at least one air nozzle spaced between the feed and discharge ends of the rotary kiln, the air nozzles injecting combustion air into the rotary kiln wherein the combustion air introduced by the air nozzles completely combusts the combustible fuel introduced by the burner before the combustible fuel exits the feed end.

2. The calcining system of claim 1 wherein the air nozzles supply at least about two percent of the total combustion air.

3. The calcining system of claim 1 wherein the air nozzles supply up to about 25 percent of the total combustion air.

4. The calcining system of claim 1 wherein the oxygen deficient atmosphere is created at the discharge end of the rotary kiln.

5. The calcining system of claim 1 wherein the combustion air is supplied to the air nozzle by a blower.

6. The calcining system of claim 1 wherein the combustion air is supplied to the air nozzle by a stationary housing with a manifold.

7. The calcining system of claim 1 wherein an exhaust gas exits the feed end of the rotary kiln after the combustible fuel is combusted.

8. The calcining system of claim 1, and further comprising a secondary air supply supplying combustion air into the rotary kiln through the discharge end of the rotary kiln.

9. The calcining system of claim 8, and further comprising a cooling device positioned adjacent the discharge end of the rotary kiln wherein the material passes through the cooling device after exiting the rotary kiln.

10. The calcining system of claim 9 wherein the cooling device preheats the combustion air supplied by the secondary air supply.

11. A system for calcining a feed material, the system comprising:
    a rotary kiln rotating on a slightly inclined horizontal axis, the rotary kiln having a feed end and a discharge end wherein the feed material is introduced into the feed end and passes through the rotary kiln before exiting the discharge end;
    means for introducing combustible fuel and combustion air into the rotary kiln at the discharge end of the rotary kiln wherein the rotary kiln operates in a substoichiometric mode near the discharge end;
    means for introducing combustion air into the rotary kiln between the feed and discharge ends wherein combustion air is introduced in an amount creating an oxygen deficient atmosphere at the discharge end of the rotary kiln such that nitrogen oxide generation is lowered and sulfur is removed from the feed material; and
    wherein the combustion air completely combusts the combustible fuel prior to the combustible fuel exiting the rotary kiln.

12. The system of claim 11 wherein the feed material passes through a preheating/precalcining device prior to entering the feed end of the rotary kiln.

13. The system of claim 11 wherein the means for introducing combustible fuel and combustion air into the rotary kiln comprises a burner.

14. The system of claim 11 wherein the means for introducing combustion air into the rotary kiln between the feed and discharge ends is a nozzle.

15. The system of claim 14 wherein more than one nozzle introduces combustion air into the rotary kiln between the feed and discharge ends.

16. The system of claim 11, and further comprising a cooling device positioned adjacent the discharge end of the rotary kiln wherein the feed material passes through the cooling device after exiting the rotary kiln.

17. The system of claim 16, and further comprising a secondary combustion air supply introducing combustion air to the rotary kiln through the discharge end wherein the cooling device preheats the combustion air supplied by the secondary combustion air supply.

18. The system of claim 11 wherein the combustion air introduced between the feed and discharge ends of the rotary kiln is at least about two percent of the total combustion air.

19. The system of claim 11 wherein the combustion air introduced between the feed and discharge ends of the rotary kiln is up to about 25 percent of the total combustion air.

20. A method for completely combusting combustible fuel added to a rotary kiln of a calcining system at a discharge end of the rotary kiln prior to the combustible fuel exiting a feed end of the rotary kiln, the rotary kiln rotating on a slightly inclined horizontal axis, the method comprising:
    introducing feed material into the rotary kiln through the feed end after the feed material has passed through a preheating/precalciner device positioned adjacent the feed end;
    introducing combustible fuel and combustion air into the rotary kiln at the discharge end through a burner located in a stationary hood positioned adjacent the discharge end of the rotary kiln, such that the rotary kiln operates in a substoichiometric mode near the discharge end; and
    introducing combustion air into the rotary kiln between the feed and discharge ends of the rotary kiln through at least one air nozzle wherein the air nozzles introduce combustion air in an amount that creates an oxygen deficient atmosphere in the rotary kiln such that nitrogen oxide generation is lowered and sulfur is removed from the feed material.

21. The method of claim 20 wherein the oxygen deficient atmosphere is created at the discharge end of the rotary kiln.

22. The method of claim 20 wherein at least two percent of the combustion air is introduced through the air nozzle.

23. The method of claim 20 wherein up to 25 percent of the combustion air is introduced through the air nozzle.

24. The method of claim 20, and further comprising introducing combustion air into the rotary kiln through the discharge end of the rotary kiln.

25. The method of claim 20, and further comprising passing the feed material through a cooling device after the feed material exits the discharge end of the rotary kiln.

26. A method for calcining a feed material in a rotary kiln rotating on a slightly inclined horizontal axis, the method comprising:
    introducing the feed material into the rotary kiln through a feed end of the rotary kiln;
    introducing combustible fuel into the rotary kiln through a burner located in a stationary hood positioned adjacent a discharge end of the rotary kiln such that the combustible fuel travels through the rotary kiln towards the feed end of the rotary kiln and the rotary kiln operates in a substoichiometric mode near the discharge end;
    introducing combustion air into the rotary kiln through the discharge end of the rotary kiln;
    injecting combustion air into the rotary kiln between the feed and discharge ends of the rotary kiln through at least one air nozzle, wherein the combustion air injected by the air nozzles completely combusts the combustible fuel introduced by the burner before the combustible fuel exits the feed end of the rotary kiln as exhaust gas; and
    creating an oxygen deficient atmosphere at the discharge end of the rotary kiln wherein the oxygen deficient atmosphere lowers nitrogen oxide generation and aids in removing sulfur from the feed material being processed.

27. The method of claim 26 wherein a portion of the combustion air introduced through the discharge end of the rotary kiln is introduced through the burner with the combustible fuel.

28. The method of claim 26 wherein a portion of the combustion air introduced through the discharge end of the rotary kiln is supplied by a combustion air supply.

29. The method of claim 26 wherein at least two percent of the combustion air is introduced through the air nozzle.

30. The method of claim 26 wherein up to 25 percent of the combustion air is introduced through the air nozzle.

* * * * *

UNITED STATES PATENT AND TRADEMARK OFFICE
CERTIFICATE OF CORRECTION

PATENT NO. : 6,474,984 B2
DATED : November 5, 2002
INVENTOR(S) : Kenneth L. Gardner It is certified that error appears in the above-identified patent and that said Letters Patent is hereby corrected as shown below:

<u>Title page,</u>
Item [73], Assignee, delete "Waukesha" and insert -- Milwaukee --

Signed and Sealed this

Seventeenth Day of February, 2004

JON W. DUDAS
*Acting Director of the United States Patent and Trademark Office*